United States Patent
Arora et al.

(10) Patent No.: US 11,240,657 B2
(45) Date of Patent: Feb. 1, 2022

(54) COMMUNICATION OF DELTA INFORMATION ASSOCIATED WITH USER EQUIPMENT CAPABILITY

(71) Applicant: QUALCOMM Incorporated, San Diego, CA (US)

(72) Inventors: Mayank Arora, Hyderabad (IN); Harish Singh Bisht, Hyderabad (IN); Arun Gilda, Hyderabad (IN); Raghuveer Ramakrishna Srinivas Tarimala, Hyderabad (IN); Narasimhan Agaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/701,889

(22) Filed: Dec. 3, 2019

(65) Prior Publication Data

US 2021/0168591 A1    Jun. 3, 2021

(51) Int. Cl.
    *H04W 8/24* (2009.01)
(52) U.S. Cl.
    CPC .................... *H04W 8/24* (2013.01)
(58) Field of Classification Search
    CPC ........................................ H04W 8/24
    (Continued)

(56) References Cited

U.S. PATENT DOCUMENTS

2015/0312787 A1* 10/2015 Das ................. H04W 36/0033
                                                   370/331
2019/0110190 A1    4/2019 Van Lieshout et al.
(Continued)

FOREIGN PATENT DOCUMENTS

| CN | 106332315 A | 1/2017 |
|---|---|---|
| EP | 3579594 A1 | 12/2019 |
| WO | 2018164528 A1 | 9/2018 |

OTHER PUBLICATIONS

Huawei, et al., "Solution for UE Radio Capabilities Changed", 3GPP Draft, 3GPP TSG-SA WG2Meeting #129bis, S2-1812188-Solution for UE Radio Capabilities Changed-V7, 3RD Generation Partnership Project (3GPP), Mobile Competence Centre, 650, Route Des Lucioles, F-06921 Sophia-Antipolis Cedex, F, vol. SA WG2, No. West Palm Beach, USA, Nov. 26, 2018-Nov. 30, 2018, Nov. 20, 2018 (Nov. 20, 2018), XP051563706, 3 Pages, Retrieved from the Internet: URL:http://www.3gpp.org/ftp/Meetings%5F3GPP%5FSYNC/SA2/Docs/S2%2D1812188%2Ezip.
(Continued)

*Primary Examiner* — Chuck Huynh
(74) *Attorney, Agent, or Firm* — Patterson + Sheridan, L.L.P.

(57) ABSTRACT

Certain aspects of the present disclosure provide techniques for communicating a user equipment (UE)'s capabilities to a network entity, such as a base station. An example method that may be performed by a UE includes transmitting a first message to a network entity, the first message comprising a base identification and a delta flag, wherein the base identification identifies base capabilities of the UE, and wherein the delta flag indicates whether there is delta information to be shared by the UE, the delta information corresponding to changes to the base capabilities of the UE. The method further includes determining whether to transmit a third message to the network entity based on whether the UE receives a second message from the network entity, the second message comprising a full capability flag indicating whether the UE should send an indication of its full capabilities to the network entity.

30 Claims, 8 Drawing Sheets

(58) Field of Classification Search
USPC .................................................. 455/422.1
See application file for complete search history.

(56) References Cited

U.S. PATENT DOCUMENTS

2019/0239064 A1* 8/2019 Stojanovski ...... H04W 36/0022
2019/0313239 A1 10/2019 Horn et al.

OTHER PUBLICATIONS

International Search Report and Written Opinion—PCT/US2020/063096—ISA/EPO—dated Mar. 10, 2021.
Mediatek Inc, et al., "Support of Delta Signalling for UE Capability Identity", 3GPP Draft, R2-1909048, 3GPP TSG-RAN WG2 Meeting #107, 3RD Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051766858, 5 Pages, Retrieved from the Internet: URL:http://www.3gpp.org/ftp/tsg_ran/WG2_RL2/TSGR2_107/Docs/R2-1909048.zip [retrieved on Aug. 16, 2019] the Whole Document.

* cited by examiner

COMMUNICATION OF DELTA INFORMATION ASSOCIATED WITH USER EQUIPMENT CAPABILITY

BACKGROUND

Field of the Disclosure

Aspects of the present disclosure relate to wireless communications, and more particularly, to techniques for communicating a user equipment's capabilities to a network entity, such as a base station.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for indicating information associated with a user equipment's (UE's) changed capabilities (also referred to as "delta information).

Certain aspects provide a method for wireless communication. The method generally includes transmitting a first message to a network entity, the first message comprising a base identification and a delta flag, wherein the base identification identifies base capabilities of the UE, and wherein the delta flag indicates whether there is delta information to be shared by the UE, the delta information corresponding to changes to the base capabilities of the UE. The method further includes determining whether to transmit a third message to the network entity based on whether the UE receives a second message from the network entity, the second message comprising a full capability flag indicating whether the UE should send an indication of its full capabilities to the network entity.

Aspects of the present disclosure also provide an apparatus comprising a memory comprising executable instructions and a processor in data communication with the memory and configured to execute the instructions to cause the apparatus to perform a method, the method comprising transmitting a first message to a network entity, the first message comprising a base identification and a delta flag, wherein the base identification identifies base capabilities of the apparatus; and the delta flag indicates whether there is delta information to be shared by the apparatus, the delta information corresponding to changes to the base capabilities of the apparatus. The method further comprises determining whether to transmit a third message to the network entity based on whether the apparatus receives a second message from the network entity, the second message comprising a full capability flag indicating whether the apparatus should send an indication of its full capabilities to the network entity.

Aspects of the present disclosure also provide a non-transitory computer readable medium having instructions stored thereon that, when executed by a user equipment (UE), cause the UE to perform a method. The method generally includes transmitting a first message to a network entity, the first message comprising a base identification and a delta flag, wherein the base identification identifies base capabilities of the UE, and wherein the delta flag indicates whether there is delta information to be shared by the UE, the delta information corresponding to changes to the base capabilities of the UE. The method further includes determining whether to transmit a third message to the network entity based on whether the UE receives a second message from the network entity, the second message comprising a full capability flag indicating whether the UE should send an indication of its full capabilities to the network entity.

Aspects of the present disclosure also provide an apparatus for wireless communications, comprising means for transmitting a first message to a network entity, the first message comprising a base identification and a delta flag. The base identification identifies base capabilities of the apparatus. The delta flag indicates whether there is delta information to be shared by the apparatus, the delta information corresponding to changes to the base capabilities of the apparatus. The apparatus also comprises means for determining whether to transmit a third message to the network entity based on whether the apparatus receives a second message from the network entity, the second message comprising a full capability flag indicating whether the apparatus should send an indication of its full capabilities to the network entity.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
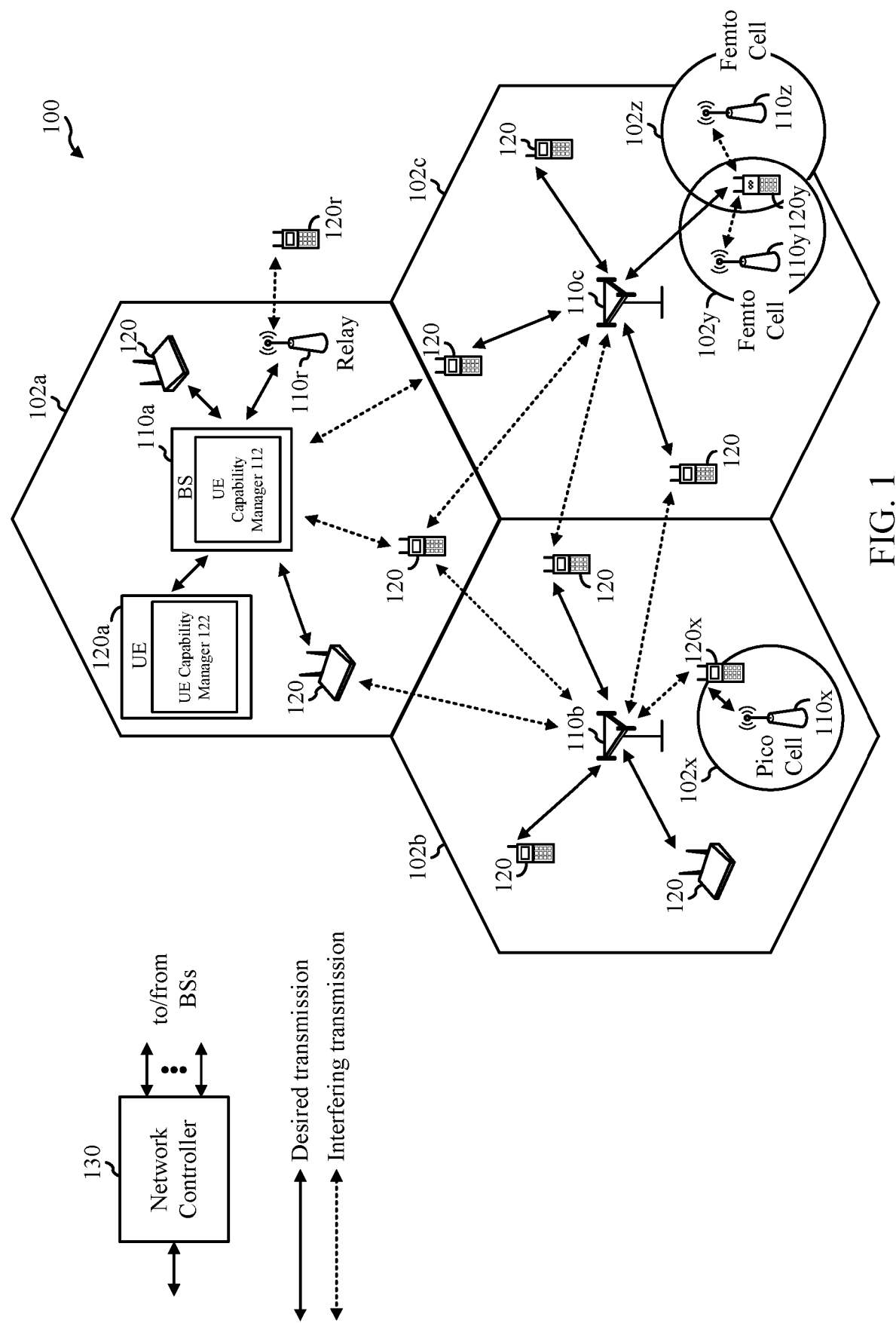
FIG. 1 is a block diagram conceptually illustrating an example telecommunications system, in accordance with certain aspects of the present disclosure.

Aspects of the present disclosure provide apparatus, methods, processing systems, and computer readable mediums for indicating information associated with a UE's changed capabilities (also referred to as "delta information). When establishing a connection with a wireless communications network, a UE may be configured to share its UE capabilities (e.g., a set of radio access capabilities of the UE, such as carrier aggregation capabilities, capabilities for supporting frequency band combinations, transmit antenna selection capabilities, downlink capabilities, uplink capabilities, Evolved Universal Terrestrial Radio Access (E-UTRA) capabilities, Universal Mobile Telecommunications Service (UTRAN) capabilities, etc.), through certain signaling procedures, with a network entity (e.g., a base station (BS)) associated with the wireless communications network. In some cases, the UE transmits a Base ID to the BS to indicate its base capabilities, which correspond to a base set of capabilities of the UE. For example, the BS may be configured with a mapping of Base IDs to sets of UE capabilities. As such the BS is able to determine a UE's base capabilities based on a Base ID received from the UE. However, after transmitting the Base ID to the BS, the UE's base capabilities may change, or the Base ID may not have indicated the actual capabilities of the UE. In such a case, it is advantageous for the UE to indicate those changes or its actual capabilities to the BS. To indicate a change or variation in its capabilities, the UE may be configured to transmit information indicating its full set of capabilities, where each capability is individually indicated. The full capabilities may only have a small variation from the UE's base capabilities (e.g., by only one or two capabilities). Transmitting a large amount of information over the network, most of which correspond to the UE's unchanged capabilities, however, is inefficient.

Aspects of the present disclosure provide techniques for indicating information associated with the UE's changed capabilities. For example, in certain embodiments, a UE is configured to indicate, in an information element within a first message that is being transmitted to BS, whether the UE's full capabilities are different from its base capabilities. The indication in the information element may include a delta flag that is indicative of whether there is delta information to be shared by the UE, the delta information corresponding to changes to the base capabilities of the UE. Instead of a flag, other types of indications may also be used. The techniques described herein also allow a BS to transmit an indication, in an information element within a second message, to the UE indicative of whether the UE should share its full capabilities. In some embodiments, in response to the second message, the UE may transmit a third message to the BS, the third message including an information element that comprises either the UE's full capabilities, just delta information, or neither, depending of what is required by the BS based on the second message and whether the UE has any delta information to share.

The following description provides examples of indicating information associated with the UE's changed capabilities in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an LTE or an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for exchanging information relating to UE 120's capabilities, as described herein. As shown in FIG. 1, the BS 110a includes a UE capability manager 112. The UE capability manager 112 may be configured to receive a first message from UE 120a, the first message comprising a base identification and a delta flag, and transmit a second message to UE 120a, the second message comprising a full capability flag indicating whether the UE should send an indication of its full capabilities to BS 110a, in accordance with aspects of the present disclosure. As shown in FIG. 1, UE 120a includes a UE capability manager 122. The UE capability manager 122 may be configured to transmit a first message to BS 110a, the first message comprising a base identification and a delta flag, receive a second message from BS 110a, the second message comprising a full capability flag indicating whether UE 120a should send an indication of its full capabilities to BS 110a, and transmit a third message to BS 110, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
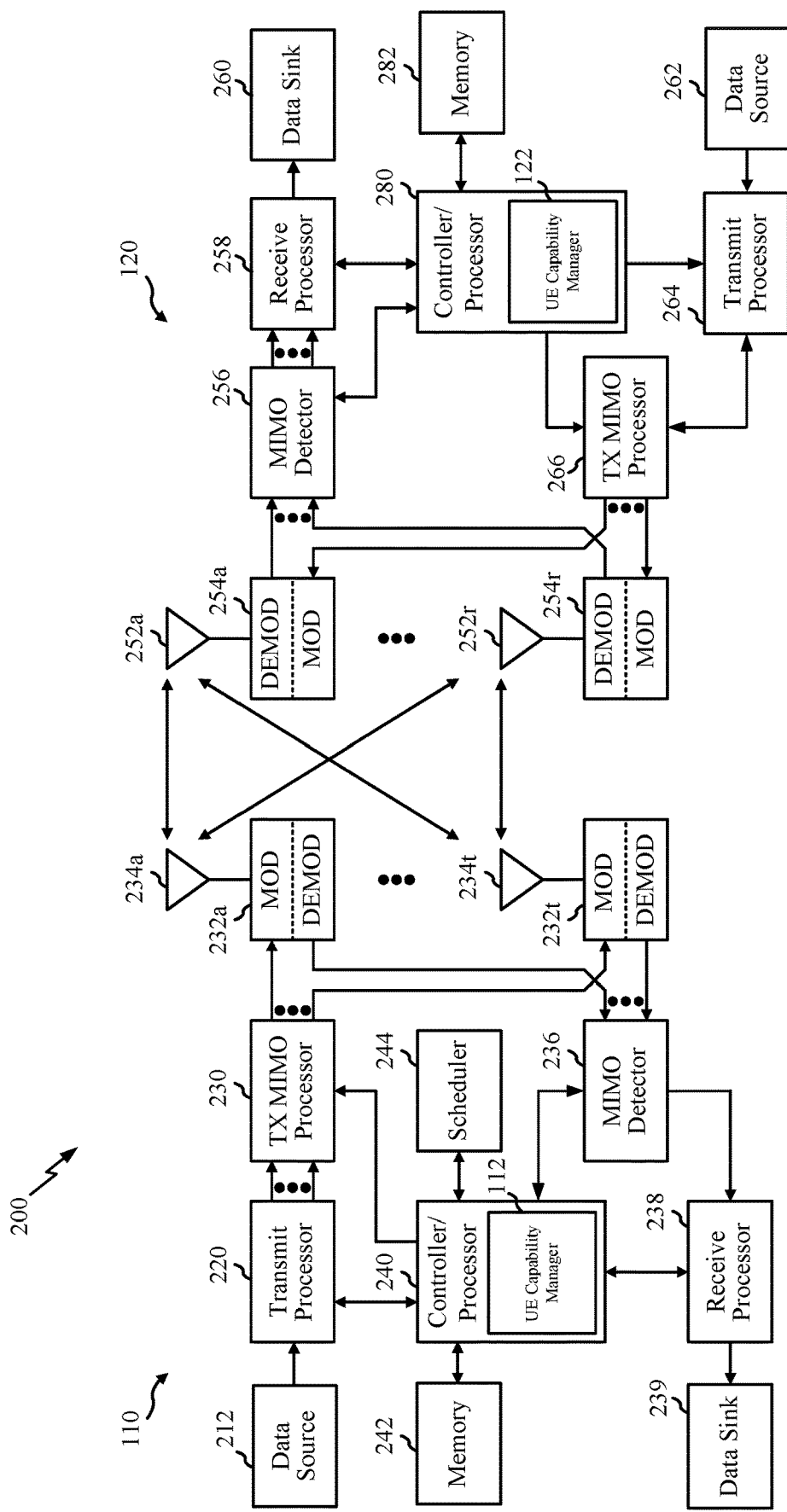
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 240 and/or other processors and modules at the BS 110a may perform or direct the execution of processes for the techniques described herein. For example, as shown in FIG. 2, the controller/processor 240 of the BS 110a has a UE capability manager 112 that may be configured for to receive a first message from UE 120a, the first message comprising a base identification and a delta flag, and transmit a second message to UE 120a, the second message comprising a full capability flag indicating whether the UE should send an indication of its full capabilities to BS 110a, and receive a third message which may include UE 120's full capabilities, delta information, or neither of the two, in accordance with certain aspects of the present disclosure.

The controller/processor 280 and/or other processors and modules at the UE 120a may perform or direct the execution of processes for the techniques described herein. As shown in FIG. 2, the controller/processor 280 of the UE 120a has UE capability manager 122 that may be configured for to transmit a first message to BS 110a, the first message comprising a base identification and a delta flag, receive a second message from BS 110a, the second message comprising a full capability flag indicating whether UE 120a should send an indication of its full capabilities to BS 110a, and transmit a third message to BS 110, in accordance with certain aspects of the present disclosure. Although shown at the Controller/Processor, other components of the UE 120a and BS 110a may be used performing the operations described herein.

When establishing a connection with a wireless communications network, such as wireless communications network 100, a UE, such as UE 120a (more generally referred to as UE 120), may be configured to share its UE capabilities, through certain signaling procedures, with a network entity associated with the wireless communications network, such as BS 110. UE capabilities refer to a set of radio access capabilities of UE 120, such as carrier aggregation capabilities, capabilities for supporting frequency band combinations, Evolved-Universal Mobile Telecommunications Service (UMTS) Terrestrial Radio Access Network (E-UTRAN) radio access capabilities, UTRAN radio access capabilities, downlink and uplink capabilities, etc. In some cases, UE 120 is able to indicate its capabilities to BS 110 using a UE Capability Identification (ID) (also referred to as a "Base ID" herein), which is a pointer or an identifier that uniquely identifies a set of default or base capabilities. In such cases, BS 110 is configured to determine UE 120's base capabilities by mapping the Base ID to the base capabilities. Using this approach, UE 120 may not need to transmit its base capabilities to BS 110 and, instead, merely transmits a Base ID that identifies the set of UE capabilities to BS 110. Herein, a UE transmitting capabilities to a BS, as described herein, refers to the UE transmitting information to the BS that includes information indicative of each of the capabilities. Also, in some cases, a UE's base capabilities may correspond to capabilities that are provided by all UEs with the same manufacturer and model.

In some cases, after transmitting the Base ID to BS 120, UE 120's base capabilities may change. For example, UE 120 may transition into a battery saving mode, which may result in UE 120 not being able to provide one or more of its base capabilities. In such an example, UE 120 may be configured to transmit its full capabilities to BS 110. The full capabilities may only have a small variation from UE 120's base capabilities (e.g., by only one or two capabilities). In such an example, transmitting a large amount of information over the network, most of which corresponds to UE 120's unchanged capabilities, is inefficient.

Herein, full capabilities refer to a UE's full set of capabilities at any point in time, such that the full capabilities may not be the same as the UE's base capabilities. In other words, in cases where the UE's capabilities have changed, information that defines a UE's full capabilities may include information that define some or most of the UE's base capabilities as well as one or more changed capabilities. As an example, a UE's base capabilities may include carrier aggregation. However, after indicating its base capabilities to the BS, at a certain point in time, the UE may not support carrier aggregation any more. In such an example, to indicate the UE's changed capabilities, the UE may be configured by certain existing techniques to transmit information indicating the UE's full capabilities, which correspond to all of the UE's base capabilities except for the carrier aggregation capability (or indicating that all of UE's capabilities are available and also indicating that carrier aggregation is not available). As described above, this may result in an inefficient use of compute and network resources, among other things.

Accordingly, what is needed are techniques and apparatus for indicating a UE's changed capabilities without having to retransmit the majority of the UE's base capabilities, in cases where the BS already has access to the UE's base capabilities.

Example Communication of Delta Information Associated with UE Capability

Aspects of the present disclosure provide techniques for indicating information associated with the UE's changed capabilities (also referred to as "delta information"). For example, in certain embodiments, a UE, such as UE 120, is configured to indicate, in an information element within a first message that is being transmitted to BS 110, whether the UE 120's full capabilities are different from its base capabilities. The indication in the information element may include a delta flag that is indicative of whether there is delta information to be shared by the UE 120, the delta information corresponding to changes to the base capabilities to the UE 120. Instead of a flag, other types of indications may also be used. The techniques described herein also allow a BS 110 to transmit an indication, in an information element within a second message, to the UE 120 indicative of whether the UE 120 should share its full capabilities. In some embodiments, in response to the second message, the UE 120 may transmit a third message to the BS 110, the third message including an information element that comprises either the UE 120's full capabilities or just delta information, depending of what is required by the BS based on the second message and whether the UE 120 has any delta information to share.

The first, second, and the third messages may be part of any signaling procedure that takes places between UE 120 and BS 110 as part of their communications. In one example, the first, second, and the third messages are messages that are communicated as part of the radio resource control (RRC) connection establishment procedure between UE 120 and BS 110. The RRC connection establishment procedure is performed in order to transition from an RRC Idle mode to an RRC Connected mode. In an RRC Connected mode, UE 120 and BS 110 are able to reliably exchange signaling messages, such as application data, etc.

In certain embodiments, UE 120 initiates the RRC connection establishment procedure and, in certain other embodiments, BS 110 initiates the procedure. Typically several messages may be exchanged between UE 120 and BS 110 in order for the RRC connection establishment procedure to be completed. In one example, the RRC connection establishment procedure may begin with UE 120 being in an RRC Idle mode and transmitting a message ("MSG1") to BS 110, the message including a Random Access preamble (also referred to as a RACH preamble, a PRACH preamble, or a sequence that is selected from 64 RACH preambles or sequences). In response to transmitting MSG1, UE 120 receives a message ("MSG2") from BS 110, the message including a random access response (RAR).

After receiving MSG2, UE 120 may transmit a message ("MSG3") referred to as a "radio resource control (RRC) Connection Request," to BS 110. MSG3 or the RRC Connection Request message may include the UE identity, for example, a temporary mobile subscriber identity (TMSI) or a random value. The TMSI may be used for identifying UE 120 in a core network associated with BS 110 and if UE 120 has previously connected to the same core network. Optionally, a random value may be used if UE 120 is connecting to the network (e.g., BS 110) for the first time. MSG3 may also include a connection establishment cause which indicates the reason UE 120 needs to connect to BS 110.

Having transmitted MSG3 to BS 110, UE 120 then receives a message ("MSG4"), also referred to as a RRC Connection Setup message, from base station 110. The RRC Connection Setup message may be a contention resolution message from base station 110 if base station 110 successfully received and/or decoded the RRC Connection Request Message. In one example, RRC Connection Setup message is transmitted by BS 110 to UE 120 to establish a signal radio bearer 1 (SRB1). Signal radio bearers are channels offered by Layer 2 to higher layers for the transfer of either user or control data. SRB1 is used for exchanging RRC messages including piggybacked Non-Access Stratum (NAS) messages as well as NAS messages.

In response to receiving MSG4, UE 120 transmits a message ("MSG5"), also referred to as a RRC Connection Setup Complete message, to BS 110. In one example, UE 120 transmits the RRC Connection Setup Complete message to BS 110 through the SRB1 to complete establishing the SRB1.

Subsequent to MSG5, messages 6 and 7 are exchanged between UE 120 and BS 110 for authentication purposes. For example, BS 110 may transmit a message ("MSG6"), also referred to as a downlink (DL) Information Transfer message, to UE 120 to transfer NAS or tunneled non-3GPP dedicated information. In response, UE 120 transmits a message ("MSG7"), also referred to as an uplink (UL) Information Transfer message, to BS 110 to transfer NAS or tunneled non-3GPP dedicated information. Subsequent to MSG7, messages 8 and 9 are exchanged between UE 120 and BS 110. For example, the UE 120 transmits a security mode command (e.g., "MSG8") to the BS 110 and, in exchange, BS 110 transmit a security mode complete ("MSG9") to UE 110. Subsequent to MSG9, BS 110 transmits a UE Capability Enquiry ("MSG10") to UE 120. MSG10 specifies what UE capability information BS 110 requires form UE 120. In return, UE 120 transmits a UE Capability Information ("MSG11") to BS 110. In addition to the messages described above (e.g., MSG1 through MSG11), BS 110 and UE 120 exchange additional messages until UE 120 is in the RRC Connected mode.

As described above, the techniques described herein relate to an exchange of a first, second, and third message between UE 120 and BS 110 that allow BS 110 to determine the UE 120's capabilities, including any changes in the UE 120's capabilities relative to the UE 120's base capabilities in an efficient manner. In some embodiments, the first, second, and third messages may be any of the RRC messages described above. In some embodiments, the first, second, and third messages may be MSG3, MSG10, and MSG11, described above. In such embodiments, UE 120 transmits a Base ID and a delta flag to BS 110 in MSG3, in response to which, in MSG10, BS 110 transmits a Full Capability flag to UE 120 that indicates whether UE 120 should transmit its full capabilities to BS 110, etc. In MSG11, UE 120 then transmits information required by BS 110 based on the Full Capability Flag.

In some other embodiments, the first, second, and third messages may be MSG5, MSG10, and MSG11, described above. In such embodiments, UE 120 transmits a Base ID and a delta flag to BS 110 in MSG5, in response to which, in MSG10, BS 110 transmits a Full Capability flag to UE 120 that indicates whether UE 120 should transmit its full capabilities to BS 110, etc. In MSG11, UE 120 then transmits information required by BS 110 based on the Full Capability Flag.

In some cases, the delta flag in the first message is set ("a set delta flag"), indicating there is delta information to be shared by UE 120. In some other cases, the delta flag in the first message is not set ("an unset delta flag"), indicating there is no delta information to be shared by UE 120. Also, in some cases, UE 120's Base ID may not be known to BS 110, while in other cases, BS 110 may be able to map UE 120's base ID to a set of base capabilities. FIGS. 3-6 illustrate messages transmitted between UE 120 and BS 110 in different scenarios (e.g., a set or an unset delta flag, a known or an unknown Base ID).

Figure 3:
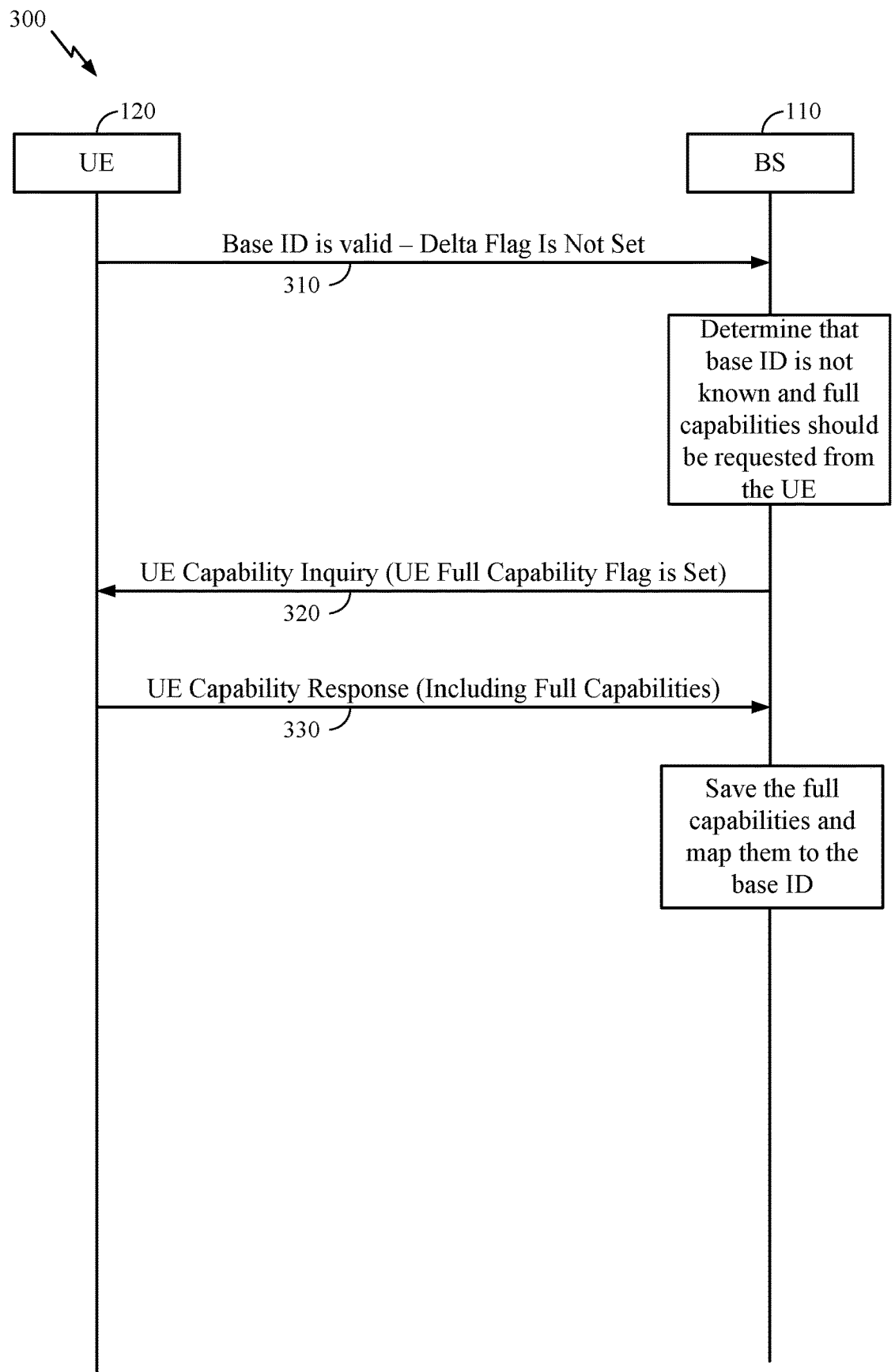
FIG. 3 is a sequence diagram illustrating example operations for wireless communication, in accordance with certain aspects of the present disclosure.

FIG. 3 is a sequence diagram illustrating example operations 300 for wireless communication, in accordance with certain aspects of the present disclosure. The operations 300 may be performed, for example, by a UE, such as UE 120 (e.g., UE 120a), in the wireless communication network 100. Operations 300 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 may begin, at 310, by UE 120 transmitting a first message to a network entity, the first message comprising a base identification and a delta flag, wherein the base identification identifies base capabilities of the UE and the delta flag indicates there is no delta information to be shared by the UE. For example, UE 120 transmits a first message (e.g., MSG3 or MSG5 of the RRC connection establishment procedure) to BS 110, where the first message includes a Base ID and a delta flag that is not set. An unset delta flag indicates that there is no delta information to be shared by UE 120. In other words, in such a case, UE 120's full capabilities are the same as UE 120's base capabilities (e.g., there has been no changes in UE 120's capabilities relative to its base capabilities). Having received the first message, BS 110 is able to determine, based on the delta flag, that the UE has no delta information to share. Further, in the example of FIG. 3, UE 120's Base ID is not known to BS 110. UE 120's Base ID may not be known to BS 120 because BS 110 is not configured with UE 120's Base ID (e.g., UE 120 is a new device in the market, etc.).

As such, BS 110 is configured to transmit a second message (e.g., MSG10 of the RRC connection establishment procedure) to UE 120 that includes a Full Capability Flag that is set. A set Full Capability Flag indicates to UE 120 that the full capabilities of UE 120 should be shared in a subsequent message. MSG10 of the RRC connection establishment procedure, as described above, is a UE Capability Enquiry message, which may include an information element that comprises the Full Capability Flag.

At step 320, operations 300 continue by UE 120 receiving the second message (e.g., MSG10) from the BS 110 including a set Full Capability Flag. Based on this message, UE 120 determines that BS 110 is requiring UE 120's full capabilities.

At step 330, operations 300 continue by UE 120 transmitting a third message a UE Capability Response to BS 110. The third message (e.g., MSG11 of the RRC connection establishment procedure) includes the full capabilities of UE 120. As described above, because there are no changes to the base capabilities of UE 120 (i.e., the delta flag was not set), the full capabilities of UE 120 are its base capabilities. As described above, in some embodiments, MSG11 is a UE Capability Information message, which may include an information element comprising, for example, the full capabilities.

Once BS 110 receives the full capabilities of UE 120, BS 110 is able to determine that what has been received represents UE 120's base capabilities based on the delta flag not being set. As such, BS 110 saves the received full capabilities and creates a mapping between the received Base ID and the received full capabilities.

Figure 4:
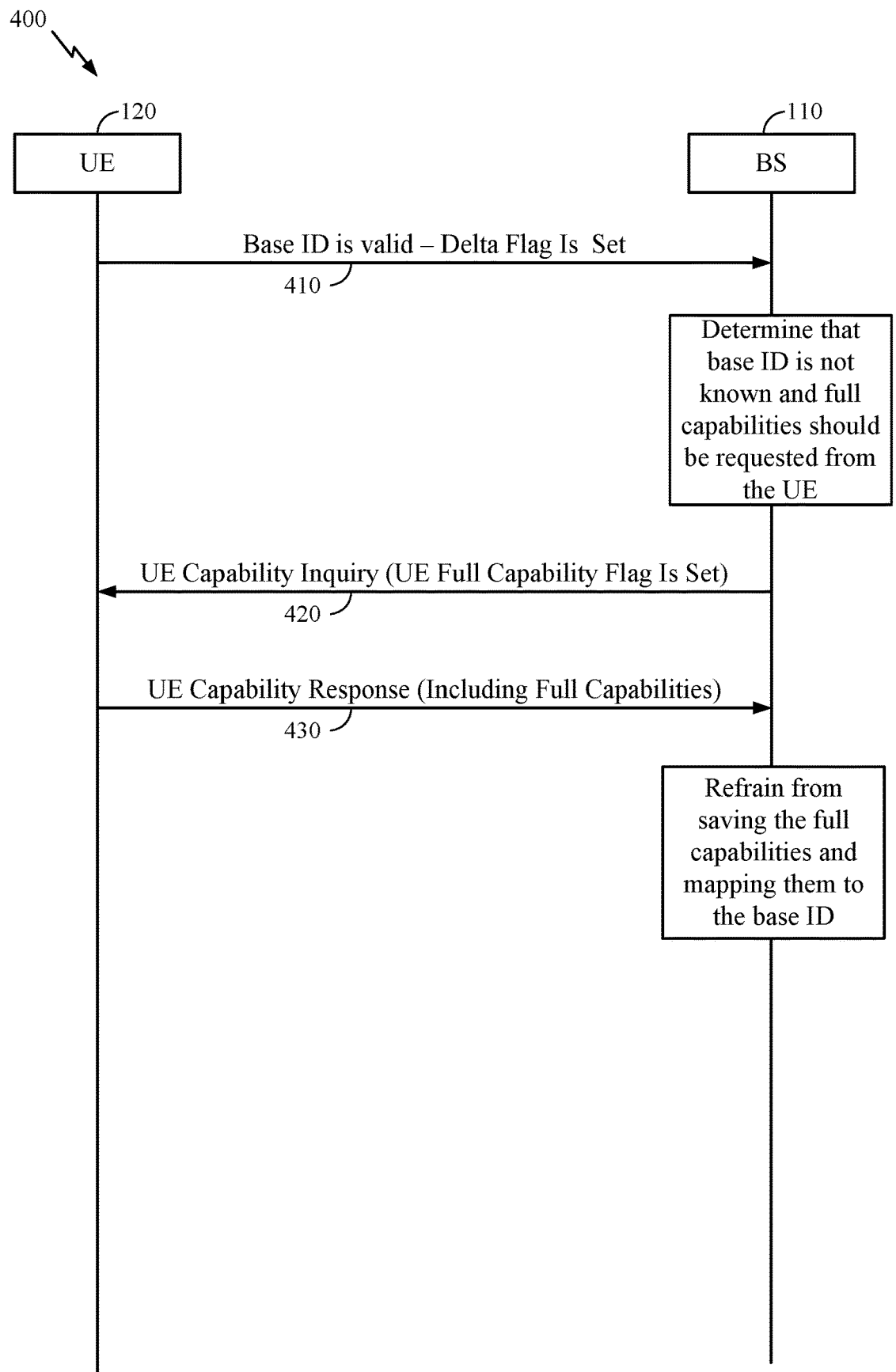
FIG. 4 is a sequence diagram illustrating example operations for wireless communication, in accordance with certain aspects of the present disclosure.

FIG. 4 is a sequence diagram illustrating example operations 400 for wireless communication, in accordance with certain aspects of the present disclosure. The operations 400 may be performed, for example, by a UE, such as UE 120 (e.g., UE 120a) in the wireless communication network 100. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 410, by UE 120 transmitting a first message to a network entity, the first message comprising a base identification and a delta flag, wherein the base identification identifies base capabilities of the UE and the first flag indicates there is delta information to be shared by the UE. For example, UE 120 transmits a first message (e.g., MSG3 or MSG5) to BS 110, where the first message includes a Base ID and a delta flag that is set. A set delta flag indicates that there is delta information to be shared by UE 120. In such a case, UE 120's full capabilities are different from UE 120's base capabilities (e.g., there has been one or more changes in UE 120's capabilities relative to its base capabilities).

Having received the first message, BS 110 is able to determine, based on the delta flag, that the UE has delta information to share. Further, in the example of FIG. 4, UE 120's base ID is not known to BS 110. As such, BS 110 is configured to transmit a second message (e.g., MSG10) to UE 120 that includes a Full Capability Flag that is set. A set Full Capability Flag indicates to UE 120 that the full capabilities of UE 120 should be shared in a subsequent message.

At step 420, operations 400 continue by UE 120 receiving the second message (e.g., MSG10) from the BS 110 including a set Full Capability Flag. Based on this message, UE 120 determines that BS 110 is requiring UE 120's full capabilities.

At step 430, operations 400 continue by UE 120 transmitting a third message to BS 110. The third message (e.g., MSG11) includes the full capabilities of UE 120. As described above, because there have been one or more changes to the base capabilities of UE 120 (i.e., the delta flag was set), the full capabilities of UE 120 are not the same as its base capabilities.

As such, once BS 110 receives the full capabilities of UE 120, it refrains from saving the full capabilities of UE 120 as its base capabilities. The UE also refrains from mapping the Base ID to the UE 120's full capabilities received at step 430.

Figure 5:
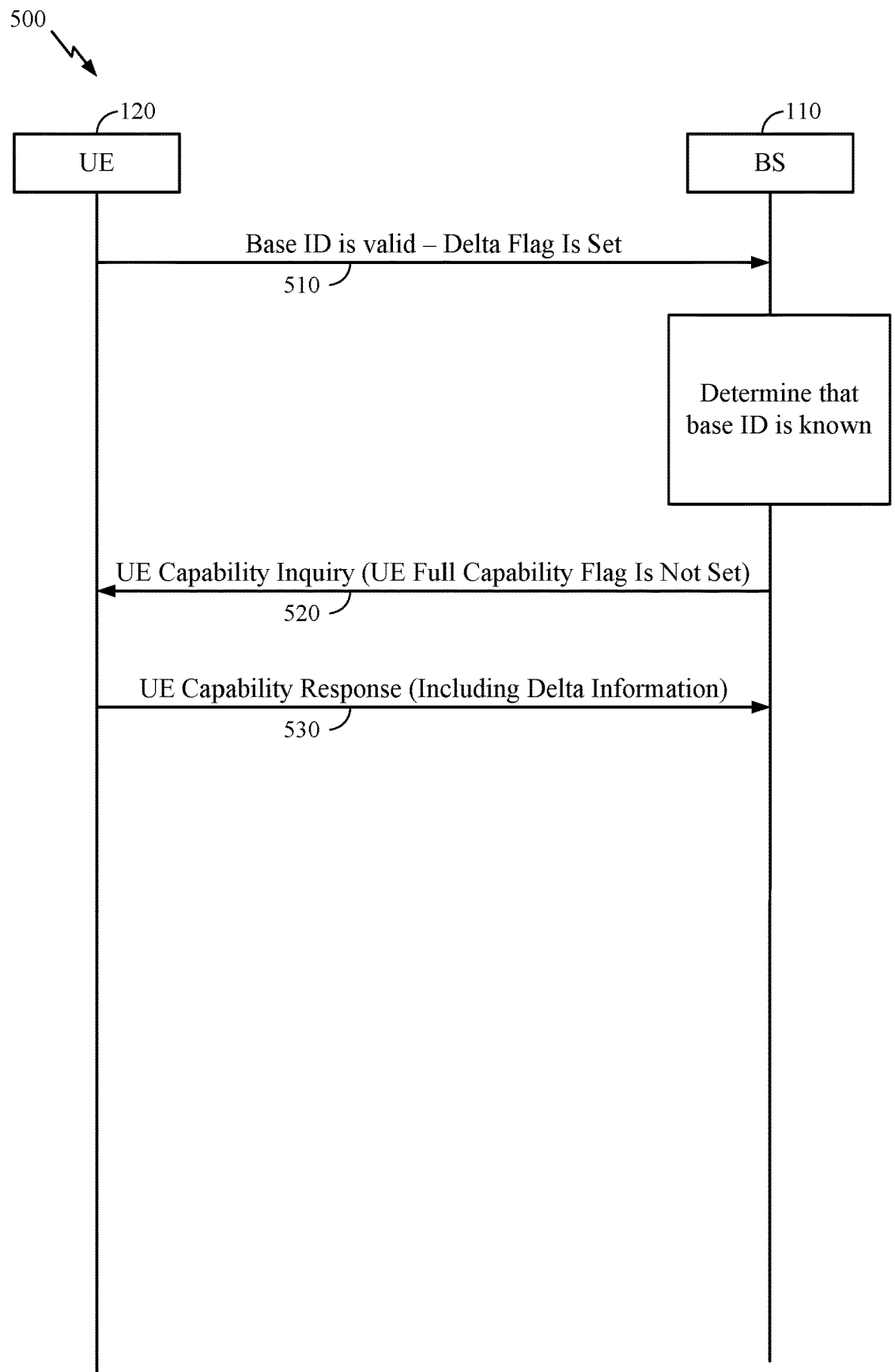
FIG. 5 is a sequence diagram illustrating example operations for wireless communication, in accordance with certain aspects of the present disclosure.

FIG. 5 is a sequence diagram illustrating example operations 500 for wireless communication, in accordance with certain aspects of the present disclosure. The operations 500 may be performed, for example, by a UE, such as UE 120 (e.g., UE 120a) in the wireless communication network 100. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 510, by UE 120 transmitting a first message to a network entity, the first message comprising a base identification and a delta flag, wherein the base identification identifies base capabilities of the UE and the first flag indicates there is delta information to be shared by the UE. For example, UE 120 transmits a first message (e.g., MSG3 or MSG5 of the RRC connection establishment procedure) to BS 110, where the first message includes a Base ID and a delta flag that is set.

Having received the first message, BS 110 is able to determine, based on the delta flag, that the UE has delta information to share. Further, in the example of FIG. 5, UE 120's base ID is known to BS 110. This means that BS 110 stores the base capabilities of UE 120 as well as the corresponding Base ID. When BS 110 receives the Base ID, it is, therefore, able to map it to UE 120's base capabilities. As such, in response, BS 110 is configured to transmit in a second message (e.g., MSG10) to UE 120 that includes an unset Full Capability Flag. An unset Full Capability Flag indicates to UE 120 that the Base ID is known to BS 110 and that BS 110 only requires UE 120 to share the delta information.

At step 520, operations 500 continue by UE 120 receiving the second message (e.g., MSG10) from the BS 110 including an unset Full Capability Flag. Based on this message, UE 120 determines that BS 110 is requiring only the delta information (i.e., information that indicates capability changes relative to UE 120's base capabilities).

At step 530, operations 500 continue by UE 120 transmitting a third message to BS 110. The third message (e.g., MSG11) includes the delta information. Delta information indicates one or more capabilities that should be added to the base capabilities and/or one or more capabilities that should be deleted from the base capabilities.

As such, once BS 110 receives the delta information, it adds and/or deletes the capabilities that need to be, respectively, added to and/or deleted from the base capabilities of UE 120 that BS 120 already stores or has access to.

Figure 6:
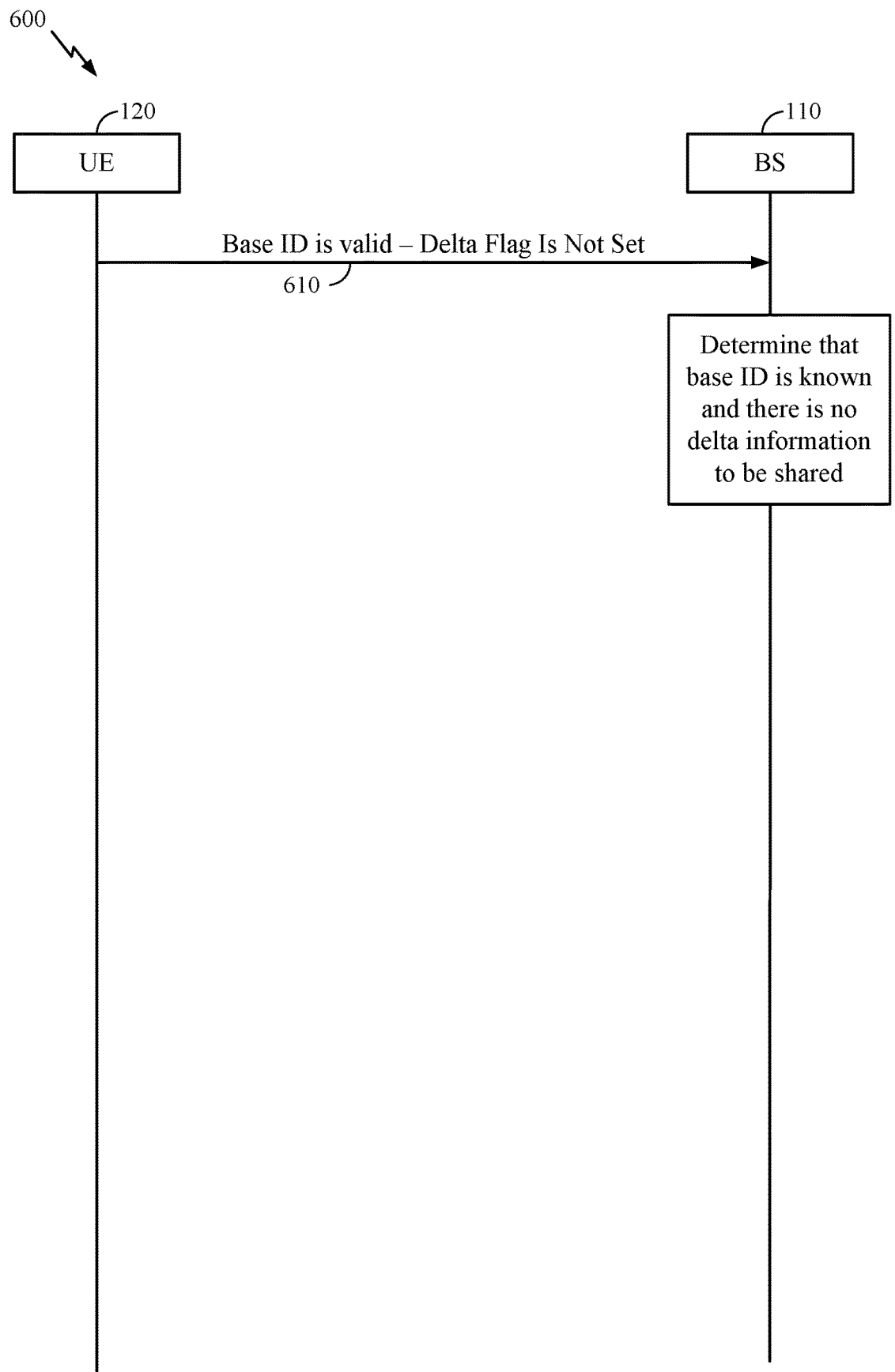
FIG. 6 is a sequence diagram illustrating example operations for wireless communication, in accordance with certain aspects of the present disclosure.

FIG. 6 is a sequence diagram illustrating example operations 600 for wireless communication, in accordance with certain aspects of the present disclosure. The operations 600 may be performed, for example, by a UE, such as UE 120 (e.g., UE 120a) in the wireless communication network 100. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 610, by UE 120 transmitting a first message to a network entity, the first message comprising a base identification and a delta flag, wherein the base identification identifies base capabilities of the UE and the first flag indicates there is no delta information to be shared by the UE 120. For example, UE 120 transmits a first message (e.g., MSG3 or MSG5 of the RRC connection establishment procedure) to BS 110, where the first message includes a Base ID and a delta flag that is not set.

Having received the first message, BS 110 is able to determine, based on the delta flag, that the UE has no delta information to share. Further, in the example of FIG. 6, UE 120's base ID is known to BS 110. As such, BS 110 does not transmit a UE Capability Enquiry message to UE 120 because BS 110 does not need any UE capability information from UE 120. In response to not receiving a UE Capability Enquiry message from BS 110, UE 110 does not transmit a UE Capability Information message to BS 110.

Figure 7:
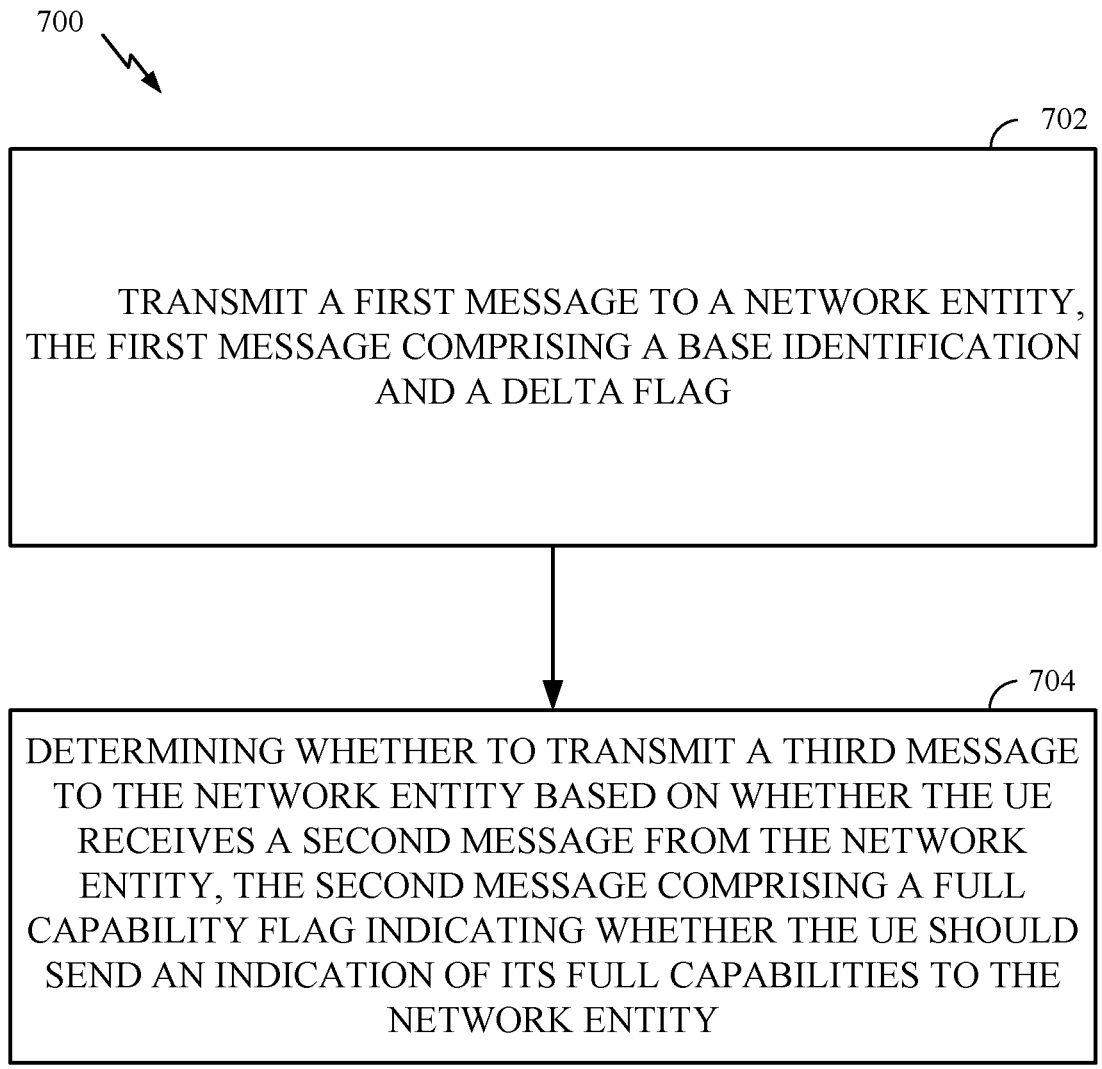
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a UE, such as UE 120 (e.g., UE 120a) in the wireless communication network 100. Operations 700 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, by UE 120 transmitting a first message to a network entity, the first message comprising a base identification and a delta flag. The base identification identifies base capabilities of the UE. The delta flag indicates whether there is delta information to be shared by the UE, the delta information corresponding to changes to the base capabilities of the UE. If the base identification is known to the BS 110 and the delta flag is not set, then BS 110 does not transmit a UE Capability Enquiry message to UE 120 and UE 120 does not transmit a UE Capability Information to BS 110 (e.g., as shown in FIG. 6). However, if the base identification is not known to BS 110 or the delta flag is set, then UE 120 transmits a third message to BS 110 that includes either the UE 120's full capabilities or only delta information At step 704, operations 700 continue by UE 120 determining whether to transmit a third message to the network entity based on whether the UE receives a second message from the network entity, the second message comprising a full capability flag indicating whether the UE should send an indication of its full capabilities to the network entity. Depending on what the second message indicates, UE 120 may transmit a third message that includes the UE 120's full capabilities or only delta information (indicating UE 120's changed or delta capabilities relative to UE 120's base capabilities).

Figure 8:
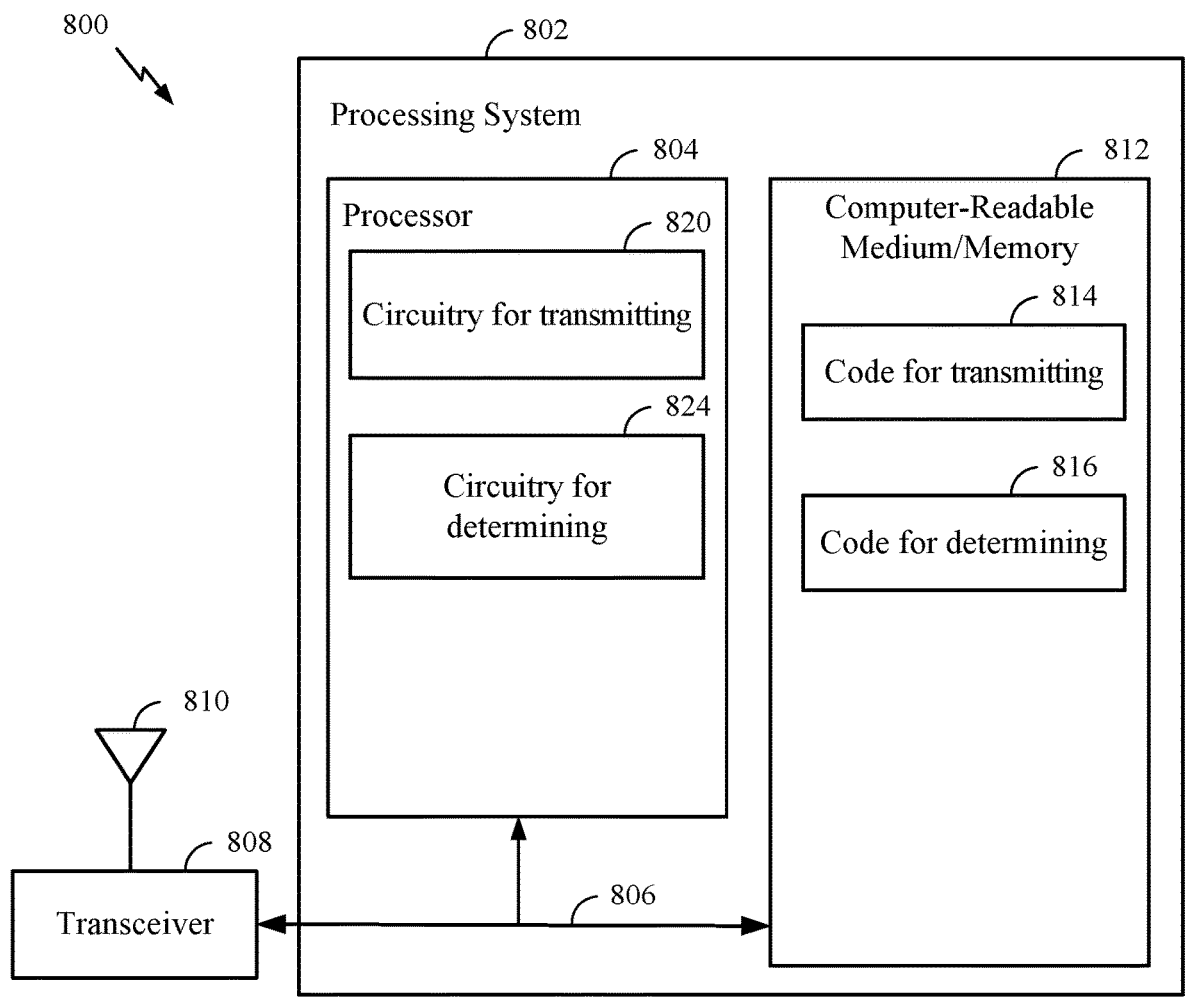
FIG. 8 illustrates a communications device that may include various components configured to perform operations for the techniques disclosed in FIG. 7, accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 7. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 7, or other operations (e.g., operations 300 through 600 of FIGS. 3-6) for performing the various techniques discussed herein for the transmission of delta information associated with the UE's capabilities. In certain aspects, computer-readable medium/memory 812 stores code 814 for transmitting a first message to a network entity, the first message comprising a base identification and a delta flag; code 816 for determining whether to transmit a third message to the network entity based on whether the UE receives a second message from the network entity, the second message comprising a full capability flag indicating whether the UE should send an indication of its full capabilities to the network entity. In certain aspects, the processor 804 has circuitry configured to implement the code stored in the computer-readable medium/memory 812. The processor 804 includes circuitry 820 for transmitting a first message to a network entity, the first message comprising a base identification and a delta flag; circuitry 824 for determining whether to transmit a third message to the network entity based on whether the UE receives a second message from the network entity, the second message comprising a full capability flag indicating whether the UE should send an indication of its full capabilities to the network entity.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3 through 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a user equipment (UE), comprising:
   transmitting a first message to a network entity, the first message comprising a base identification and a delta flag, wherein:
      the base identification identifies base capabilities of the UE, wherein the base identification is selected from a plurality of base identifications based on a mapping of base identifications to different sets of UE capabilities; and
      the delta flag indicates whether there is delta information to be shared by the UE, the delta information corresponding to changes to the base capabilities of the UE; and
   determining whether to transmit a third message to the network entity based on whether the UE receives a second message from the network entity, the second message comprising a full capability flag indicating whether the UE should send an indication of its full capabilities to the network entity.

2. The method of claim 1, further comprising:
   receiving the second message, wherein the delta flag indicates there is no delta information to be shared by the UE and the full capability flag indicates the UE should send an indication of its full capabilities; and
   transmitting a third message to the network entity, the third message including information indicating the full capabilities of the UE, the full capabilities being the base capabilities.

3. The method of claim 2, wherein upon receiving the full capabilities from the UE, the network entity is configured to save the full capabilities and map the base identification to the full capabilities.

4. The method of claim 1, further comprising:
   receiving the second message, wherein the delta flag indicates there is delta information to be shared by the UE and the full capability flag indicates the UE should send an indication of its full capabilities; and
   transmitting a third message to the network entity, the third message including information indicating the full capabilities of the UE, the full capabilities including the base capabilities and the delta information.

5. The method of claim 4, wherein upon receiving the full capabilities from the UE, the network entity is configured to refrain from saving the full capabilities.

6. The method of claim 1, further comprising:
receiving the second message, wherein the delta flag indicates there is delta information to be shared by the UE and the full capability flag indicates the UE should not send an indication of its full capabilities; and
transmitting a third message to the network entity, the third message including the delta information.

7. The method of claim 1, wherein:
the delta flag indicates there is no delta information to be shared by the UE and the base identification is known by the network entity; and
determining whether to transmit the third message comprises determining to refrain from transmitting the third message in response to not receiving the second message from the network entity.

8. The method of claim 1, wherein:
the first message comprises a radio resource control (RRC) connection request message; and
the second message comprises a UE capability enquiry message; and
the third message comprises a UE capability information message.

9. The method of claim 1, wherein:
the first message comprises a radio resource control (RRC) connection setup complete; and
the second message comprises a UE capability enquiry message; and
the third message comprises a UE capability information message.

10. An apparatus, comprising:
a memory; and
a processor with coupled to the memory, the processor and the memory configured to:
transmit a first message to a network entity, the first message comprising a base identification and a delta flag, wherein:
the base identification identifies base capabilities of the apparatus wherein the base identification is selected from a plurality of base identifications based on a mapping of base identifications to different sets of apparatus capabilities; and
the delta flag indicates whether there is delta information to be shared by the apparatus, the delta information corresponding to changes to the base capabilities of the apparatus; and
determine whether to transmit a third message to the network entity based on whether the apparatus receives a second message from the network entity, the second message comprising a full capability flag indicating whether the apparatus should send an indication of its full capabilities to the network entity.

11. The apparatus of claim 10, wherein the processor and the memory are further configured to:
receive the second message, wherein the delta flag indicates there is no delta information to be shared by the apparatus and the full capability flag indicates the apparatus should send an indication of its full capabilities; and
transmit a third message to the network entity, the third message including information indicating the full capabilities of the apparatus, the full capabilities being the base capabilities.

12. The apparatus of claim 11, wherein upon receiving the full capabilities from the apparatus, the network entity is configured to save the full capabilities and map the base identification to the full capabilities.

13. The apparatus of claim 10, wherein the processor and the memory are further configured to:
receive the second message, wherein the delta flag indicates there is delta information to be shared by the apparatus and the full capability flag indicates the apparatus should send an indication of its full capabilities; and
transmit a third message to the network entity, the third message including information indicating the full capabilities of the apparatus, the full capabilities including the base capabilities and the delta information.

14. The apparatus of claim 13, wherein upon receiving the full capabilities from the apparatus, the network entity is configured to refrain from saving the full capabilities.

15. The apparatus of claim 10, wherein the processor and the memory are further configured to:
receive the second message, wherein the delta flag indicates there is delta information to be shared by the apparatus and the full capability flag indicates the apparatus should not send an indication of its full capabilities; and
transmit a third message to the network entity, the third message including the delta information.

16. The apparatus of claim 10, wherein:
the delta flag indicates there is no delta information to be shared by the apparatus and the base identification is known by the network entity; and
to determine whether to transmit the third message comprises to determine to refrain from transmitting the third message in response to not receiving the second message from the network entity.

17. The apparatus of claim 10, wherein:
the first message comprises a radio resource control (RRC) connection request message; and
the second message comprises a user equipment (UE) capability enquiry message; and
the third message comprises a UE capability information message.

18. The apparatus of claim 10, wherein:
the first message comprises a radio resource control (RRC) connection setup complete; and
the second message comprises a user equipment (UE) capability enquiry message; and
the third message comprises a UE capability information message.

19. A non-transitory computer readable medium having instructions stored thereon that, when executed by a user equipment (UE), cause the UE to perform a method comprising:
transmitting a first message to a network entity, the first message comprising a base identification and a delta flag, wherein:
the base identification identifies base capabilities of the UE, wherein the base identification is selected from a plurality of base identifications based on a mapping of base identifications to different sets of UE capabilities; and
the delta flag indicates whether there is delta information to be shared by the UE, the delta information corresponding to changes to the base capabilities of the UE; and
determining whether to transmit a third message to the network entity based on whether the UE receives a second message from the network entity, the second message comprising a full capability flag indicating whether the UE should send an indication of its full capabilities to the network entity.

20. The non-transitory computer readable medium of claim 19, wherein the method further comprises:
  receiving the second message, wherein the delta flag indicates there is no delta information to be shared by the UE and the full capability flag indicates the UE should send an indication of its full capabilities; and
  transmitting a third message to the network entity, the third message including information indicating the full capabilities of the UE, the full capabilities being the base capabilities.

21. The non-transitory computer readable medium of claim 20, wherein upon receiving the full capabilities from the UE, the network entity is configured to save the full capabilities and map the base identification to the full capabilities.

22. The non-transitory computer readable medium of claim 19, wherein the method further comprises:
  receiving the second message, wherein the delta flag indicates there is delta information to be shared by the UE and the full capability flag indicates the UE should send an indication of its full capabilities; and
  transmitting a third message to the network entity, the third message including information indicating the full capabilities of the UE, the full capabilities including the base capabilities and the delta information.

23. The non-transitory computer readable medium of claim 22, wherein upon receiving the full capabilities from the UE, the network entity is configured to refrain from saving the full capabilities.

24. The non-transitory computer readable medium of claim 19, wherein the method further comprises:
  receiving the second message, wherein the delta flag indicates there is delta information to be shared by the UE and the full capability flag indicates the UE should not send an indication of its full capabilities; and
  transmitting a third message to the network entity, the third message including the delta information.

25. The non-transitory computer readable medium of claim 19, wherein:
  the delta flag indicates there is no delta information to be shared by the UE and the base identification is known by the network entity; and
  determining whether to transmit the third message comprises determining to refrain from transmitting the third message in response to not receiving the second message from the network entity.

26. The non-transitory computer readable medium of claim 19, wherein:
  the first message comprises a radio resource control (RRC) connection request message; and
  the second message comprises a UE capability enquiry message; and
  the third message comprises a UE capability information message.

27. The non-transitory computer readable medium of claim 19, wherein:
  the first message comprises a radio resource control (RRC) connection setup complete; and
  the second message comprises a UE capability enquiry message; and
  the third message comprises a UE capability information message.

28. An apparatus for wireless communications, comprising:
  means for transmitting a first message to a network entity, the first message comprising a base identification and a delta flag, wherein:
    the base identification identifies base capabilities of the apparatus, wherein the base identification is selected from a plurality of base identifications based on a mapping of base identifications to different sets of apparatus capabilities; and
    the delta flag indicates whether there is delta information to be shared by the apparatus, the delta information corresponding to changes to the base capabilities of the apparatus; and
  means for determining whether to transmit a third message to the network entity based on whether the apparatus receives a second message from the network entity, the second message comprising a full capability flag indicating whether the apparatus should send an indication of its full capabilities to the network entity.

29. The apparatus of claim 28, further comprising:
  means for receiving the second message, wherein the delta flag indicates there is no delta information to be shared by the apparatus and the full capability flag indicates the apparatus should send an indication of its full capabilities; and
  means for transmitting a third message to the network entity, the third message including information indicating the full capabilities of the apparatus, the full capabilities being the base capabilities.

30. The apparatus of claim 29, wherein upon receiving the full capabilities from the apparatus, the network entity is configured to save the full capabilities and map the base identification to the full capabilities.

* * * * *